US006742423B1

(12) United States Patent
Huang

(10) Patent No.: US 6,742,423 B1
(45) Date of Patent: Jun. 1, 2004

(54) PERPENDICULARLY DISPLACED WINDOW SHADE ROLLER CUTTING ASSEMBLY

(76) Inventor: Wen-Chong Huang, 6th Fl., No. 2, Sec. 3, Minsheng E. Rd., Taipei (TW)

(*) Notice: Subject to any disclaimer, the term of this patent is extended or adjusted under 35 U.S.C. 154(b) by 0 days.

(21) Appl. No.: 10/440,166

(22) Filed: May 19, 2003

(51) Int. Cl.[7] .................................................. B23B 5/14

(52) U.S. Cl. ................................ 82/101; 82/86; 82/83; 30/92

(58) Field of Search ............................ 82/46, 63, 70.2, 82/83, 86, 101, 173; 30/92, 93, 96

(56) References Cited

U.S. PATENT DOCUMENTS

| | | | | |
|---|---|---|---|---|
| 3,299,754 A | * | 1/1967 | Steingass et al. | 82/98 |
| 3,772,762 A | * | 11/1973 | Stark | 29/401.1 |
| 4,092,775 A | * | 6/1978 | Erpenbeck | 30/95 |
| 4,403,415 A | * | 9/1983 | Kufrin | 30/96 |
| 4,589,313 A | * | 5/1986 | Meyers et al. | 82/63 |

* cited by examiner

*Primary Examiner*—Willmon Fridie, Jr.
(74) *Attorney, Agent, or Firm*—Birch, Stewart, Kolasch & Birch, LLP

(57) ABSTRACT

A window shade roller cutting assembly includes a base placed on a surface, a hollow guiding rod perpendicularly mounted on top of the base and having a fixing plate securely mounted on a side of the guiding rod, a measuring rod movable relative to the guiding rod, a clamping device mounted under the fixing plate and being able to selectively move from a first position to a second position and vice versa for securing and releasing a workpiece, a motor mounted on a side of the guiding rod to drive the driving disk to rotate, and a controlling device pivotal in relation to the fixing plate and operatably connected to the motor to activate the motor to rotate so that when the controlling device is pivoted toward the workpiece which is clamped by the clamping blocks, the cutting blade is able to cut the workpiece.

20 Claims, 12 Drawing Sheets

PERPENDICULARLY DISPLACED WINDOW SHADE ROLLER CUTTING ASSEMBLY

BACKGROUND OF THE INVENTION

1. Field of the Invention

The present invention relates to a window shade roller cutting assembly, and more particularly to a window shade cutting assembly which is perpendicularly standing on a surface to save space.

2. Description of Related Art

A conventional window shade roller cutting assembly normally is horizontally displaced on a working table to provide services to customers who have different requirements in length of the window shade. After a precise measurement to the length of the window shade, the window shade cutting assembly is able to cut off a portion of the window shade with an appropriate length to satisfy the customers' needs. However, the conventional window shade cutting assembly normally is placed in a corner of a mall where available space is used to make the bast effect out of it. Therefore, if the window shade cutting assembly is placed horizontally in a corner, at least two side walls are useless, which is quite a waste of space. U.S. Pat. No. 4,403,415 concerns a window shade roller with shade cutting assembly including an elongated tubular shade holder to be clamped onto a rolled shade and an elongated tubular collar which is rotatably coupled to the shade holder. It is to be noted from the patent that a large space is occupied when the shade cutting assembly is deployed and this is a major drawback of the conventional cutting assembly.

To overcome the shortcomings, the present invention tends to provide an improved window shade roller cutting assembly to mitigate the aforementioned problems.

SUMMARY OF THE INVENTION

The primary objective of the present invention is to provide an improved window shade roller cutting assembly which is perpendicularly displaced on a surface so that only minimum space is used.

Another objective of the present invention is to provide an elongated guiding rod and a measuring rod movable relative to the guiding rod and having a magnifier fixed onto the measuring rod and regularly spaced markings thereon.

Still another objective of the present invention is to provide a clamping device mounted on a fixing plate which is secured to the guiding rod. The clamping device is able to securely clamp a workpiece inserted therein so that the window shade roller cutting assembly is able to cut the workpiece easily.

A further objective of the present invention is to provide a cutting blade which is able to rotate in a unidirectional direction opposite to the rotational direction of the clamping device such that every time the cutting blade is used, the cutting edge of the cutting blade is changed for prolonging the life span of the cutting blade.

Other objects, advantages and novel features of the invention will become more apparent from the following detailed description when taken in conjunction with the accompanying drawings.

DETAILED DESCRIPTION OF THE PREFERRED EMBODIMENT

Figure 1:
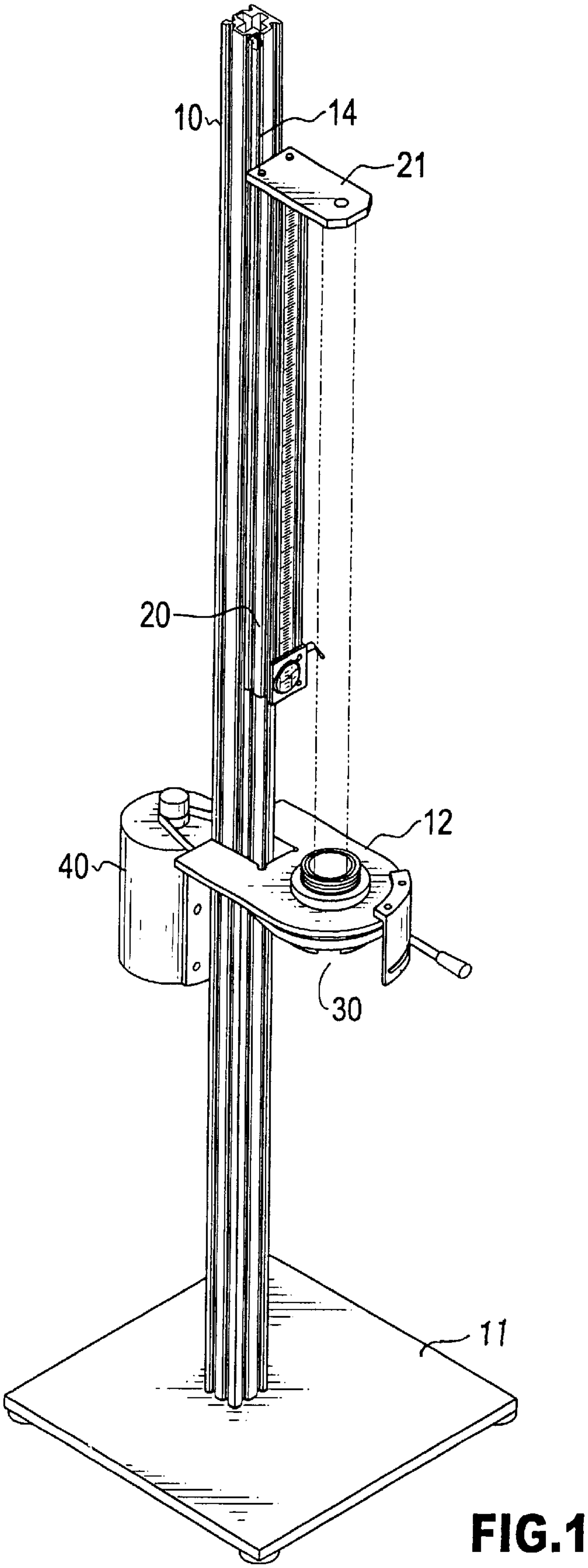
FIG. 1 is a perspective view of the window shade roller cutting assembly of the present invention.

With reference to FIG. 1, the window shade roller cutting assembly in accordance with the present invention includes a hollow guiding rod (10) perpendicularly standing on a base (11) which is placed on a surface, such as ground, a measuring rod (20) longitudinally movable relative to the guiding rod (10), a clamping device (30) which is securely connected to the guiding rod (10) via a fixing plate (12) and a motor (40) mounted on a side of the guiding rod (10) opposite to the clamping device (30).

Figure 2:
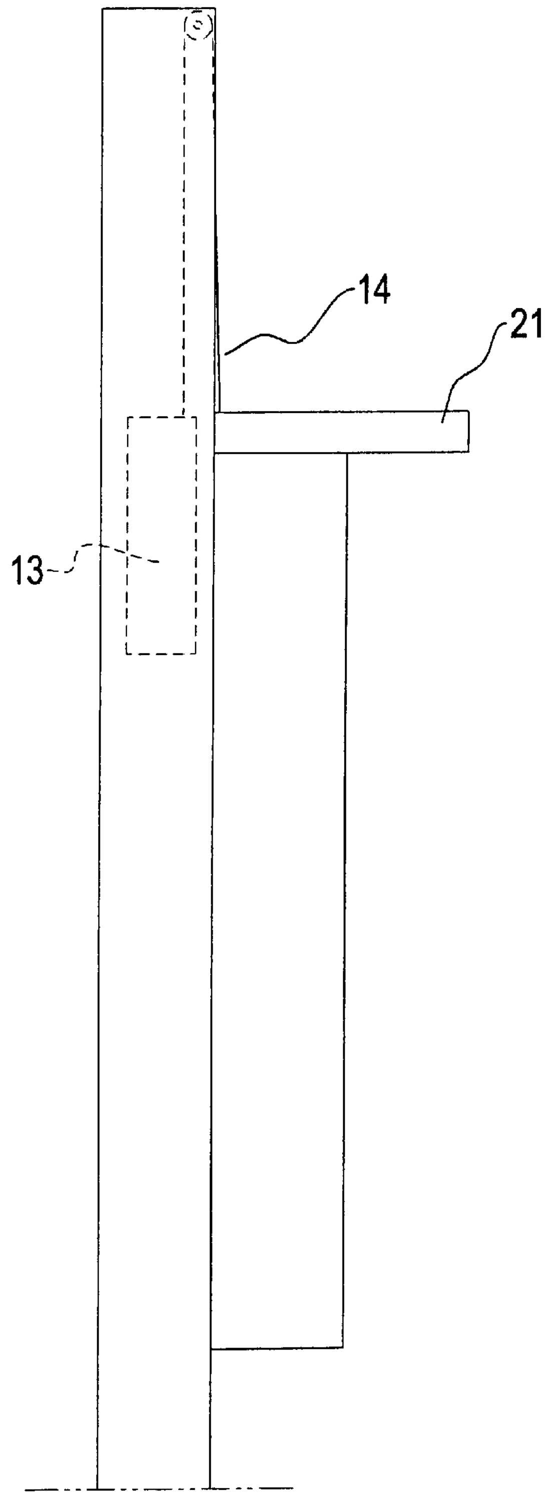
FIG. 2 is a schematic view showing the balance between the guiding rod and the measuring rod.

With reference to FIG. 2 and still taking FIG. 1 for reference, it is noted that a weight (13) is received in the guiding rod (10) and connected to the measuring rod (20) via a connector (14), preferably a chain. By means of the weight (13) and the connector (14), every time the measuring rod (20) is moved relative to the guiding rod (10), the measuring rod (20) is able to maintain balance with respect to the guiding rod (10). The measuring rod (20) further has a cap (21) mounted on top of the measuring rod (20) to be connected to the connector (14).

Figure 3:
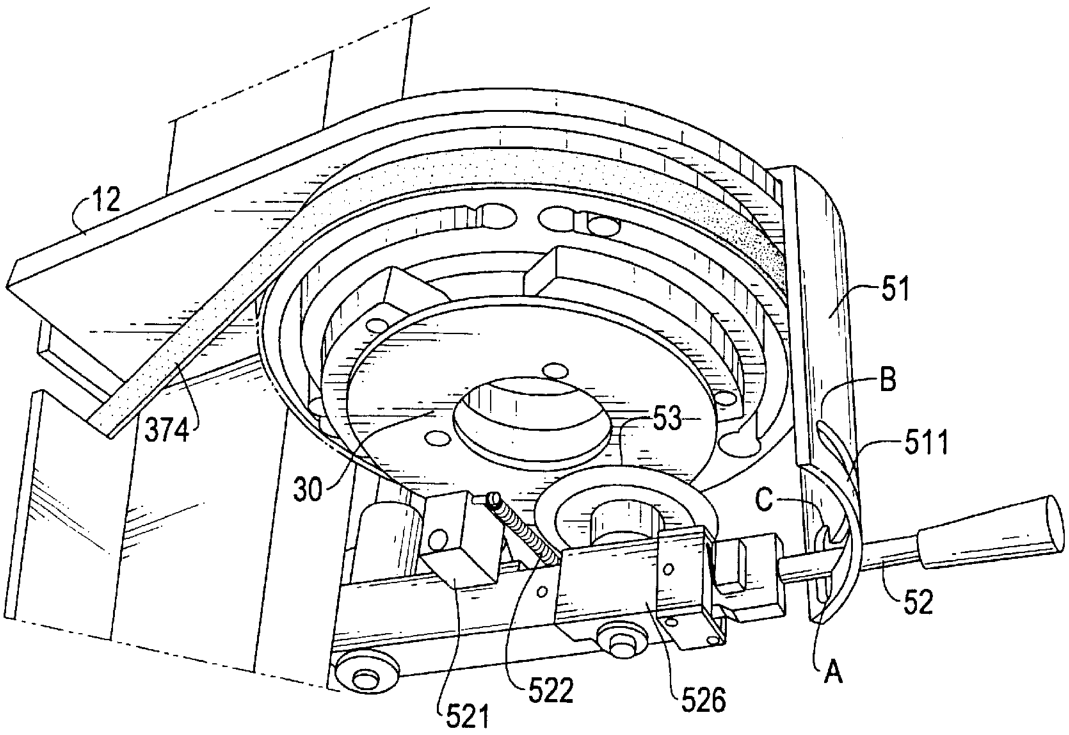
FIG. 3 is a perspective view of the clamping device and the controlling handle, wherein for clarity purpose, the perspective view of the clamping device and the controlling handle are shown in a bottom angle.
Figure 4:
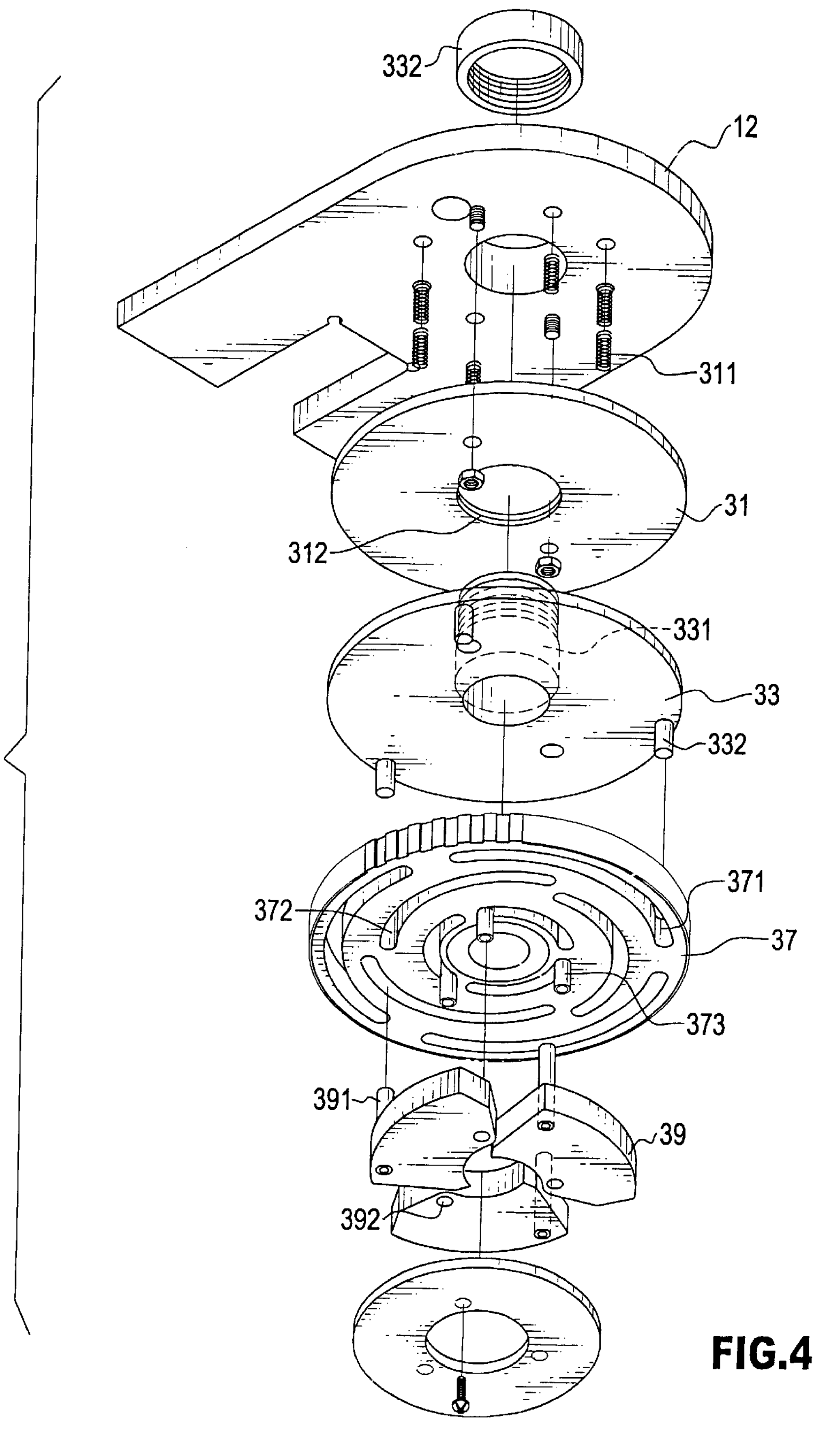
FIG. 4 is an exploded perspective view of the clamping device.

With reference to FIGS. 3 and 4, the clamping device (30) is mounted under the fixing plate (12) and includes a brake disk (31), a rotation disk (33), a driving disk (35) and clamping blocks (39). The brake disk (31) is securely connected to a bottom face of the fixing plate (12) via i.e. screws and has multiple first springs (311) securely sandwiched between the brake disk (31) and the fixing plate (12) prior to the secure engagement between the fixing plate (12) and the brake plate (31) and a bearing (312) securely received in the brake disk (31). The rotation disk (33) has a centrally formed projection (331) extending through the bearing (312) of the brake disk (31) and the fixing plate (12) to connect to a securing ring (332) such that the brake disk (31) is sandwiched between the rotation disk (33) and the fixing plate (12). The rotation disk (33) further has bosses (332) each formed on a peripheral edge of the rotation disk (33). The driving disk (37) is defined with multiple first arcuate slots (371) adjacent to a peripheral edge of the driving disk (37) to correspond to the bosses (332) of the rotation disk (33), multiple second arcuate slots (372) each having a first end close to a center of the driving disk (37) and a second end away from the center of the driving disk (37) and multiple extensions (373) formed under the driving disk and being close to the center of the driving disk (37). Each of the clamping blocks (39) is sectorial and has a bar (391) formed on the clamping block (39) to correspond to one of the second arcuate slots (372) of the driving disk (37) and a through hole (392) defined to correspond to one of the extensions (373) of the driving disk (37).

When the clamping device of the present invention is to be assembled, after the first springs (311) are sandwiched between the brake disk (31) and the fixing plate (12), the projection (331) extends through the brake disk (31) and the fixing plate (12) to secure with the securing ring (332) so as to securely sandwich the brake disk (31) between the fixing plate (12) and the rotation disk (33). Then each boss (332) is inserted into a corresponding one of the first arcuate slots (371) while each bar (391) is inserted into a corresponding one of the second arcuate slots (372) and each extension (373) is inserted into a corresponding one of the through holes (392). Thereafter, a bottom cover (393) is securely connected to each of the extensions (373) by such as riveting. After the assembly of the clamping device of the present invention, each boss (332) is able to reciprocally move from a first position to a second position in the corresponding first arcuate slot (371) and vice versa. Meantime, each bar (391) is able to reciprocally move from a first position to a second position in the corresponding second arcuate slot (372) and vice versa. That is, when the driving disk (37) rotates in a first direction, the bosses (332) and the bars (391) are able to move from the first position to the second position in the first and second arcuate slots (371,372) respectively. Still, when the driving disk (37) rotates in the first direction, the clamping blocks (39) are able to move closer to each other due to the slant design of the second arcuate slots (372). However, when the driving disk (37) rotates in a second direction, the clamping blocks (39) are able to move far away from each other because each bar (391) moves from the first end to the second end of the second arcuate slot (372).

Figure 5:
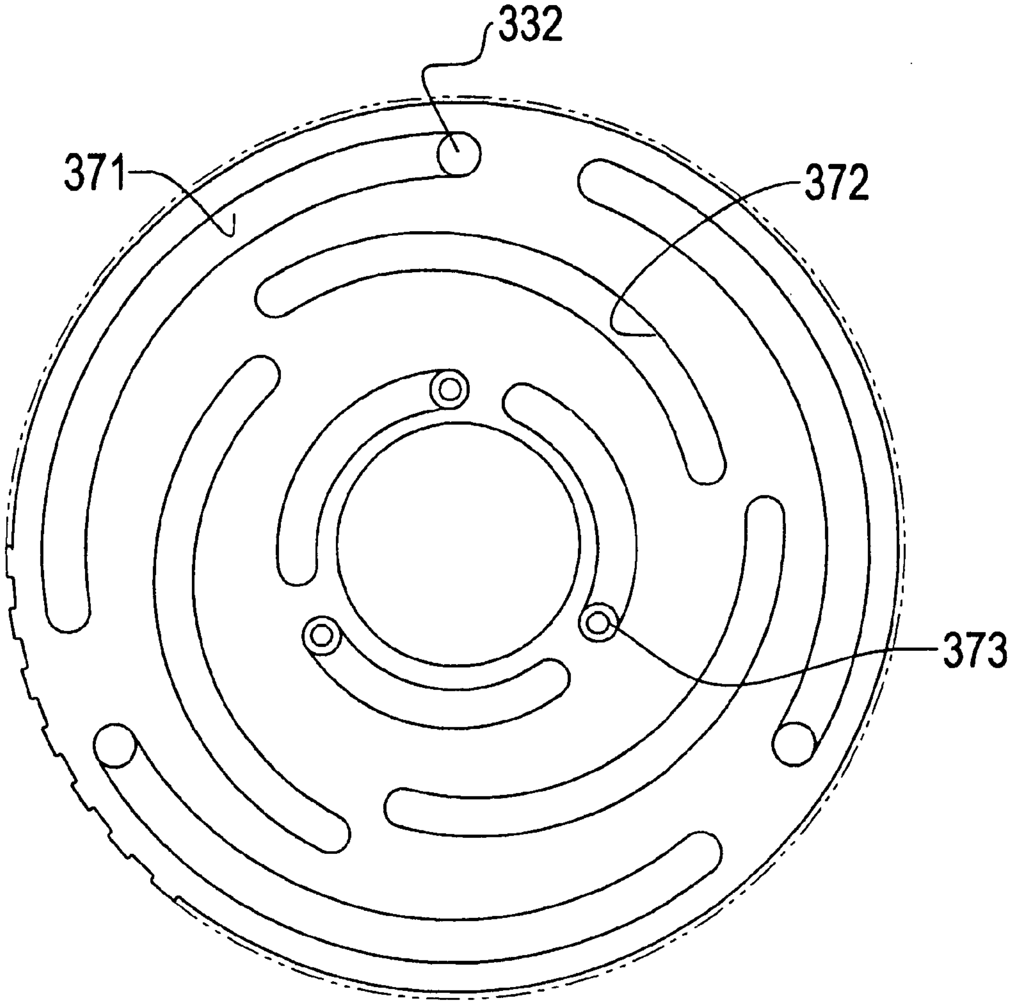
FIG. 5 is a bottom view showing the clamping device after assembly.
Figure 7:
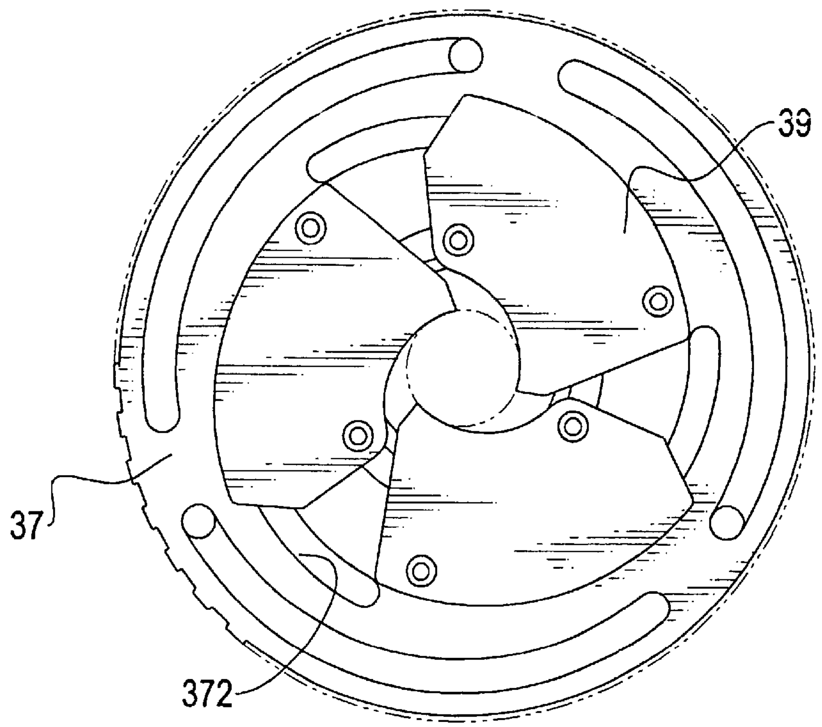
FIG. 7 is a top plan view showing the clamping device after operation.
Figure 6:
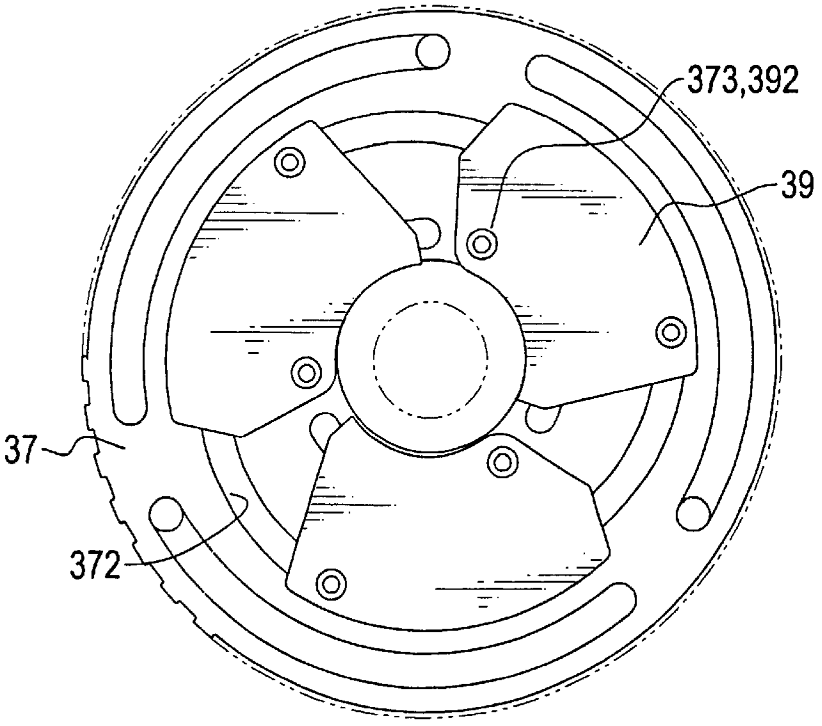
FIG. 6 is a top plan view showing the clamping device before operation.

With reference to FIGS. 5, 6 and 7, it is noted that after the bosses (332) are received in the first arcuate slots (371), the rotation disk (33) is driven by the driving disk (37). Further, when the clamping device (30) is not activated or the rotation disk (37) is rotating in the second direction, each of the clamping blocks (39) are limited from moving by both the extensions (373) in the through holes (392) and the bars (391) in the second arcuate slots (372), as shown in FIG. 4. Yet, when the driving disk (37) is rotating in the second direction, due to the slant design of the second arcuate slots (372), the clamping blocks (39) moves toward each other.

Figure 8:
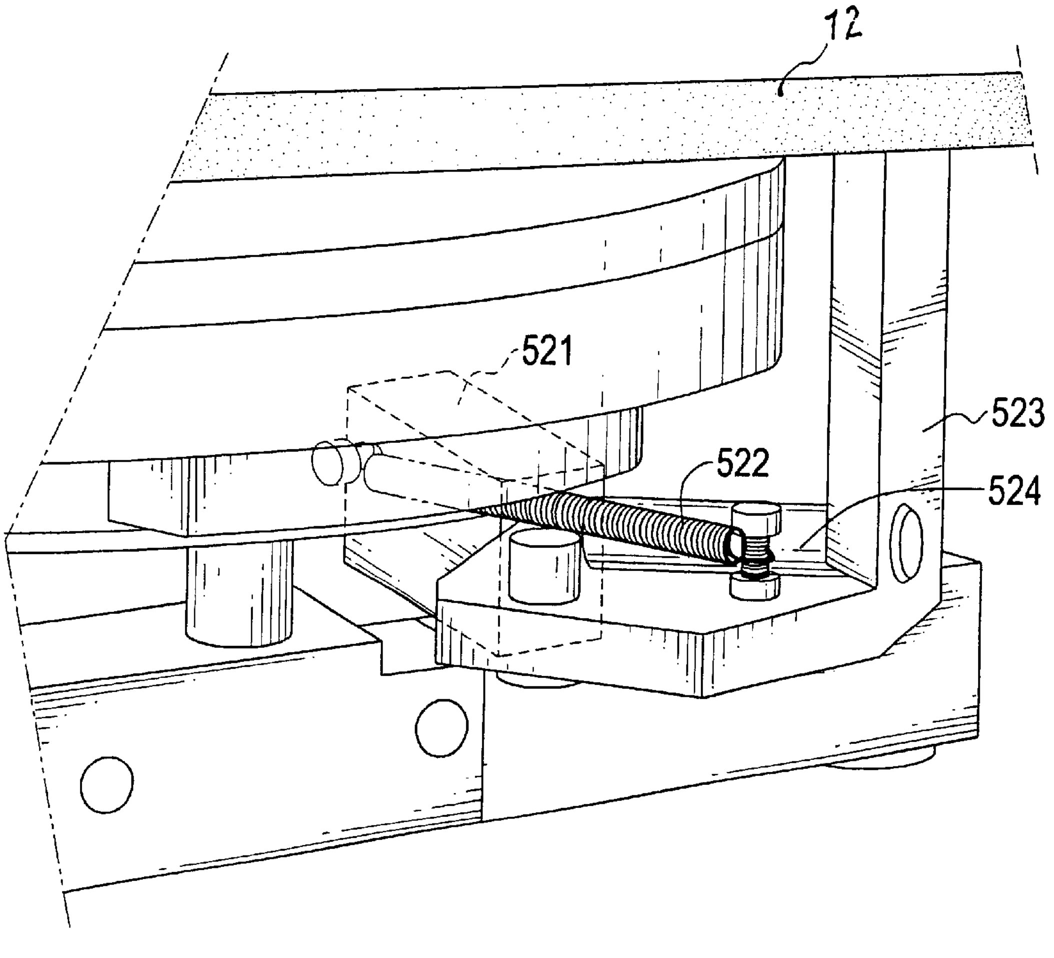
FIG. 8 is a perspective view showing that the controlling handle is supported by a resilient element.
Figure 9:
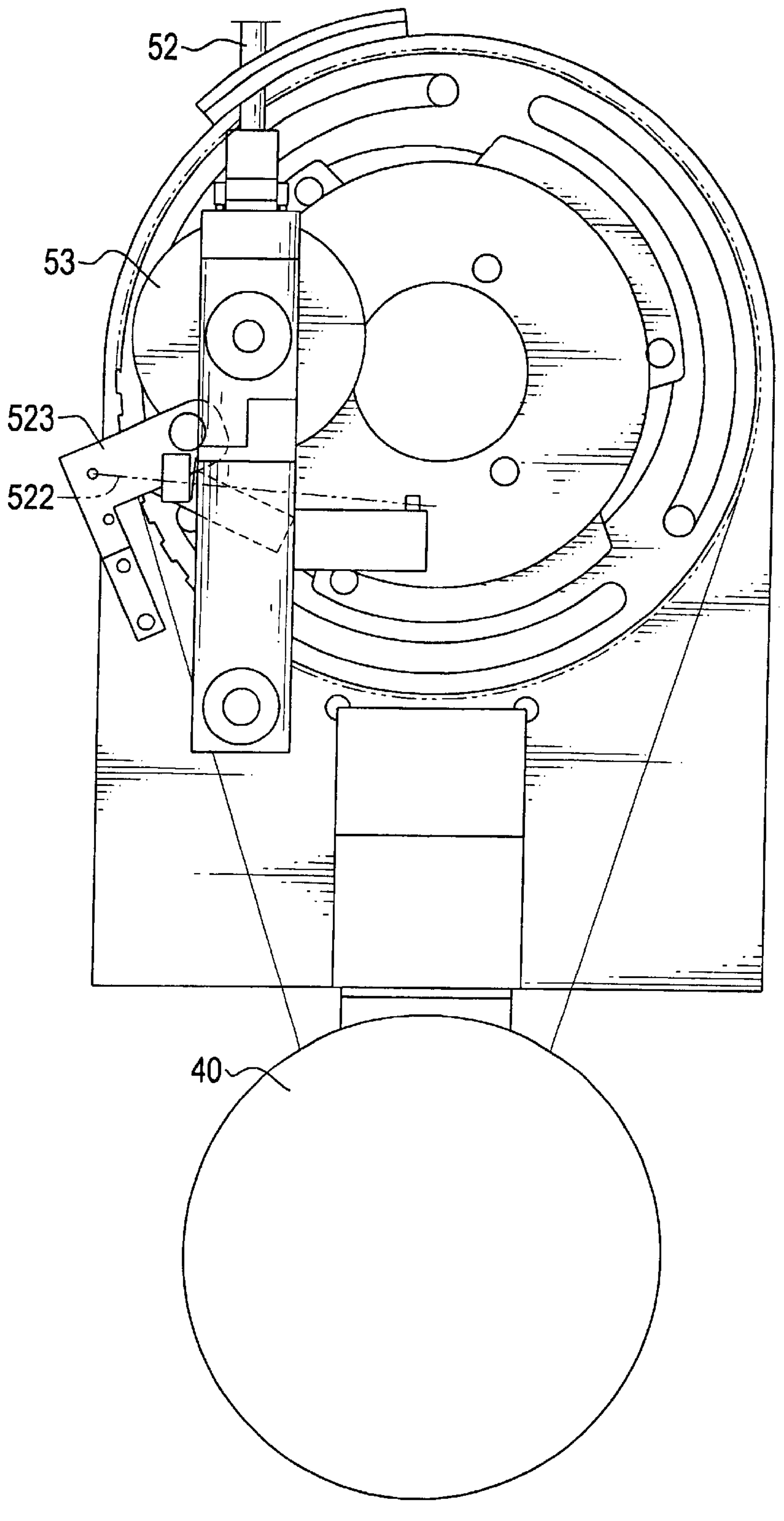
FIG. 9 is a schematic view showing the status before actuation of the cutting process of the present invention.
Figure 10:
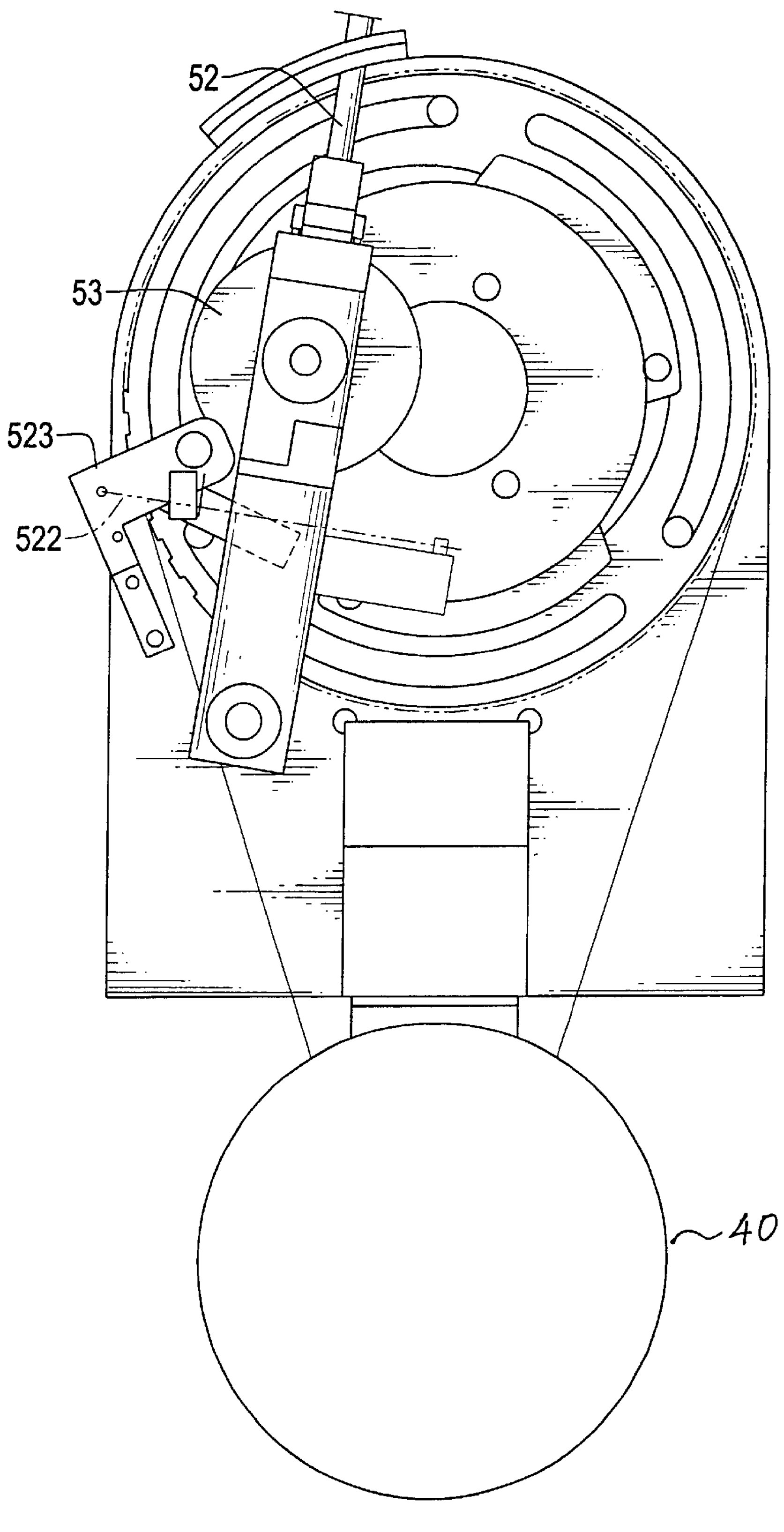
FIG. 10 is a schematic view showing the status after the actuation of the cutting process of the present invention.

Referring to FIG. 3 and taking FIGS. 8, 9 and 10 for reference, the window shade roller cutting assembly of the present invention further has a controlling device (50) which includes a limiting plate (51) secured to the fixing plate (12) and having a limiting slot (511) defined therein, a controlling handle (51) pivotally connected to the fixing plate (12) and movably received in the limiting slot (511) and a cutting blade (53) securely mounted on the controlling handle (52). The controlling handle (52) further has a block (521) integrally formed on the controlling handle (52), a second spring (522) securely sandwiched between the block (521) and a seat (523) firmly connected to a bottom face of the fixing plate (12) and a stop (524) integrally extending from a side of the seat (523) to abut a side face of the block (521). Therefore, when the motor (40) is activated by moving the controlling handle (52) in a neutral position to a first position (point A) in the limiting slot (511), the motor rotates in the first direction, which drives the driving disk (37) via a belt (374) that connects the driving disk (37) to the motor (40). The rotation of the driving disk (37) in the first direction thus brings all the clamping blocks (39) together to clamp a window shade roller (the workpiece). After the window shade roller (workpiece) is securely clamped by the clamping blocks (39), the motor (40) stops rotation and then the controlling handle (52) is lifted back to the neutral position.

When the controlling handle (52) is moved to a second position (point B), again, the motor (40) is activated to rotate in the first direction so that the workpiece is still securely clamped. Meantime, the movement of the controlling handle (52) drives the movement of the cutting blade (53) to move as well such that the workpiece is cut. To be noted is that when the controlling handle (52) is moved from the first position to the second position (point A to point B), the second spring (522) is stretched so that a recovery force is stored in the second spring (522). After the workpiece is cut, if the controlling handle (52) is released, the recovery force in the second spring (522) drives the controlling handle (52) back to the neutral position, which deactivates the rotation of the motor (40).

Figure 11:
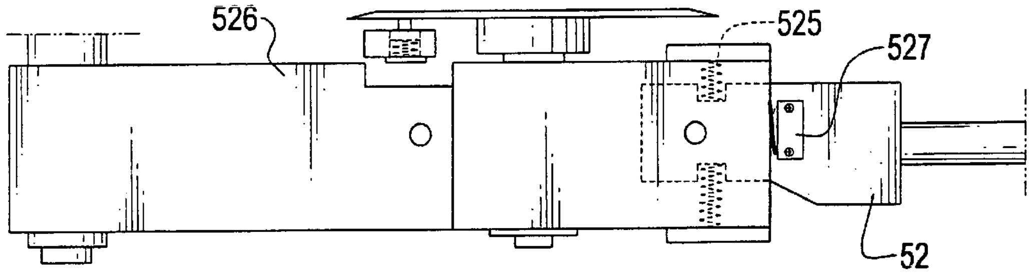
FIGS. 11 to 13 are schematic views showing a supporting device is provided on opposite sides of the controlling handle to support the controlling handle in an equilibrant position no matter how the controlling handle is operated.
Figure 12:
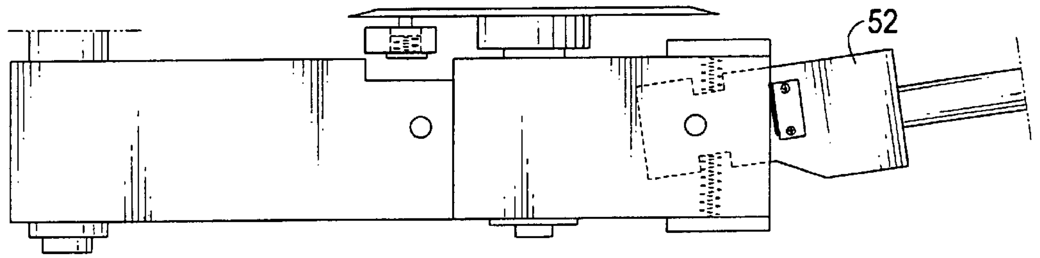
Figure 13:
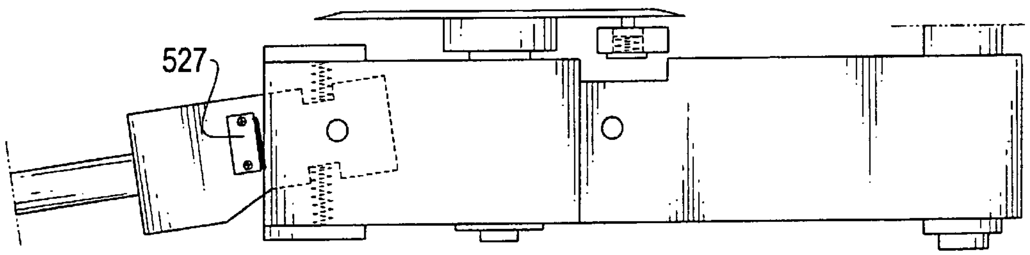

With reference to FIGS. 11 to 13, the controlling handle (52) is supported by two resilient members (525) respectively secured in a tube (526) which is pivotally connected to the fixing plate (12). Therefore, when the controlling handle (52) is moved and then released, the controlling handle (52) always returns to a neutral position relative to the tube (526) without any inclination. Furthermore, switches (527) are provided on sides of the tube (526) to enable the controlling handle (52) to activate the motor (40) to rotate in the first direction or the second direction. That is, if the controlling handle (52) is moved from the neutral position to the third position (point C as shown in FIG. 3), the motor (40) will be activated to rotate in the second direction, which moves the clamping blocks (39) away from each other such that the user is able to remove the cut workpiece.

Figure 14A:
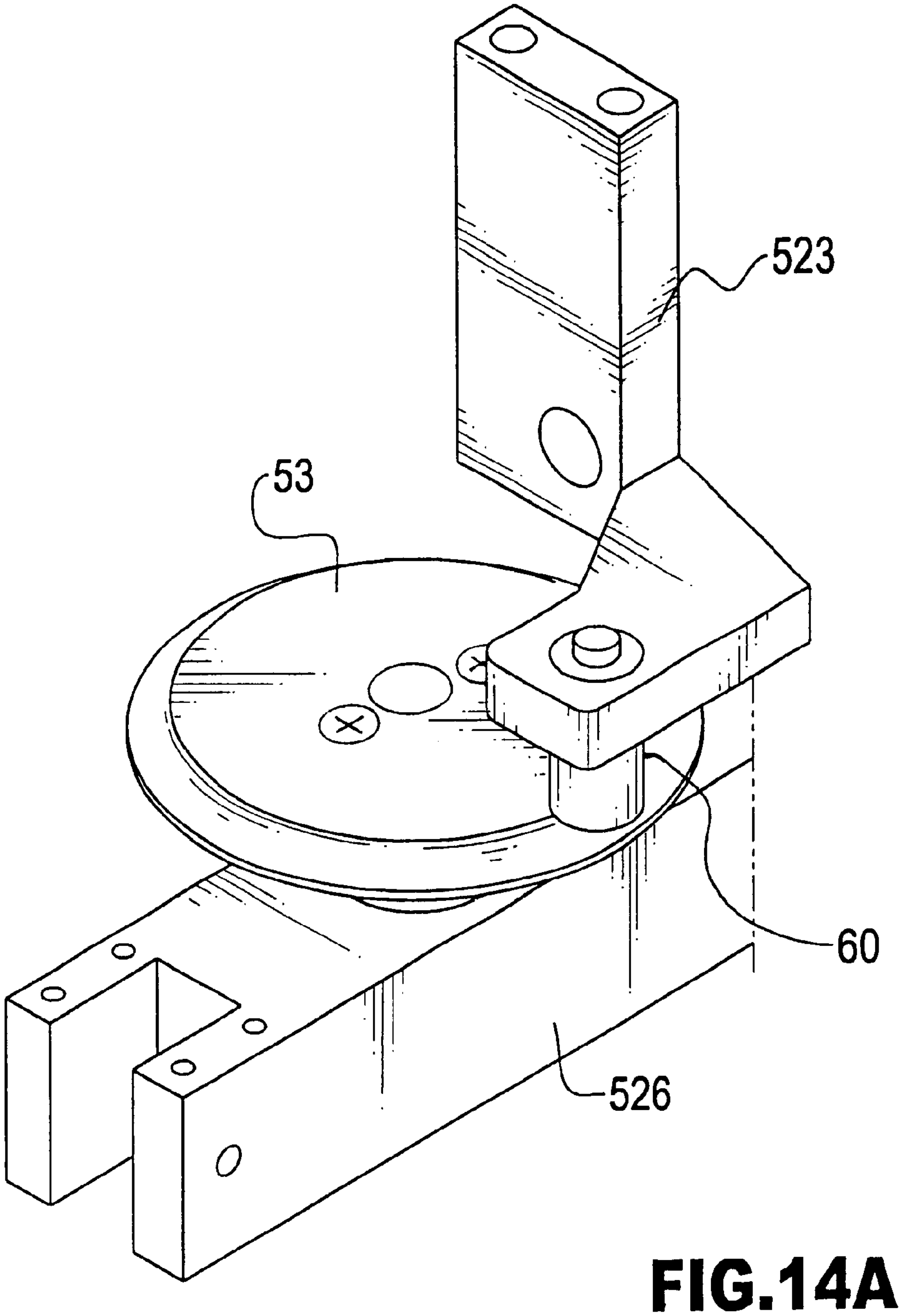
FIG. 14A is a perspective view showing the relationship between the unidirectional device and the cutting blade.
Figure 14B:
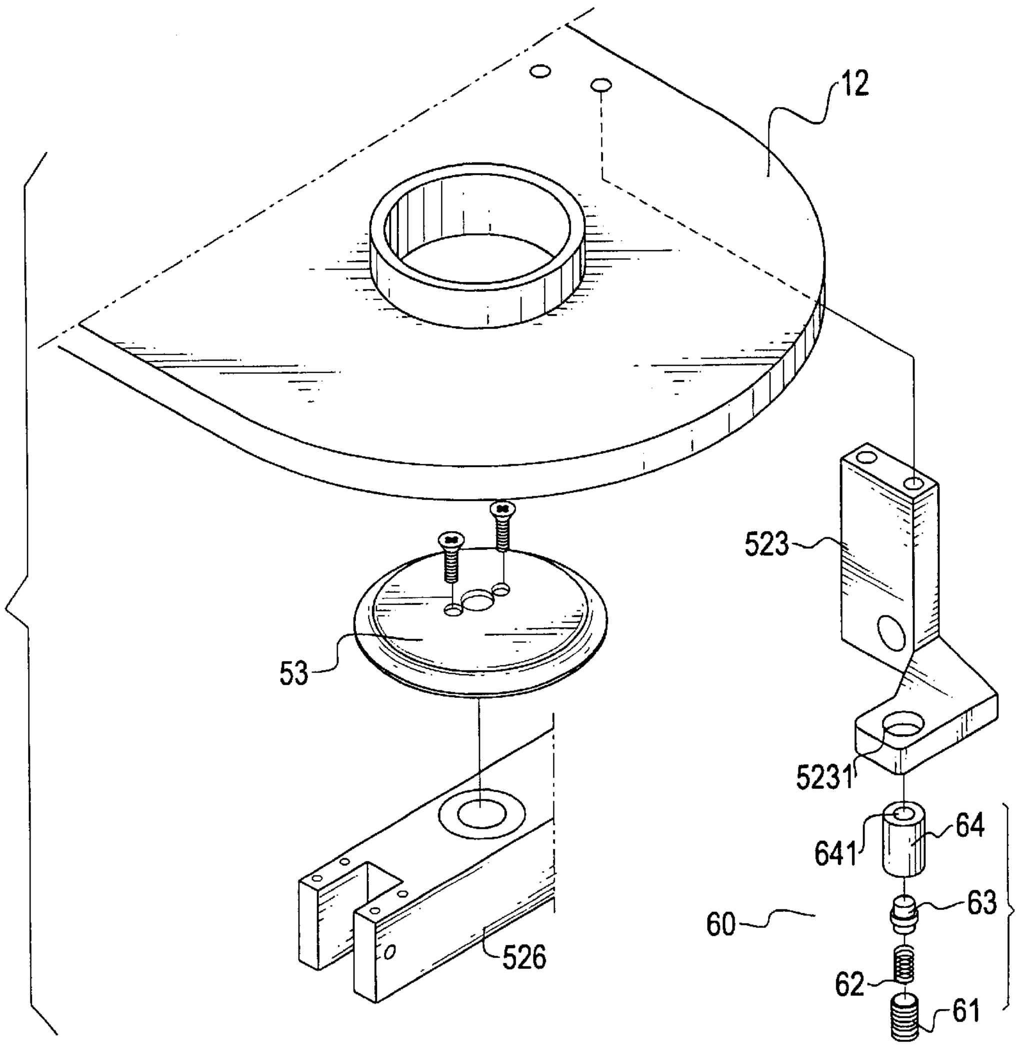
FIG. 14B is an exploded perspective view showing parts of the unidirectional device.

Furthermore, a unidirectional device (60), as shown in FIGS. 14A and 14B, is provided to the cutting blade (53) to allow the cutting blade (53) to rotate for a small angle every time the cutting blade (53) is driven by the controlling handle (52) to cut the workpiece. The unidirectional device (60) is rotated in a direction opposite to the rotational direction of the motor (40) so that when the cutting blade (53) is moved to the rotating workpiece, the cutting blade (53) can still cut the workpiece easily. The unidirectional device (60) is mounted on the seat (523) and includes a plug (61) detachably received in a receiving hole (5231) in the seat (523), an abutting spring (62) having a first end engaged with the plug (61), an abutting pin (63) having a first end engaged with a second end of the abutting spring (62) and a collar (664) securely received in the receiving hole (5231) and having therein a path (641) to allow the second end of the abutting pin (63) to extend through the path (641) to be connected to the cutting blade (53).

After the foregoing described unidirectional device (60) is assembled, it is noted that the cutting blade (53) will engage with the abutting pin (63) every time the controlling handle

(52) is driving the cutting blade (53) toward the workpiece. That is, every time the cutting blade (53) is used to cut the workpiece, the cutting blade (53) will be forced by the abutting pin (63) to rotate for a small angle such that the life span of the cutting blade (53) is prolonged.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A window shade roller cutting assembly comprising:

a base adapted to be placed on a surface;

a hollow guiding rod perpendicularly mounted on top of the base and having a fixing plate securely mounted on a side of the guiding rod;

a measuring rod movable relative to the guiding rod and having equally spaced markings formed on the measuring rod and an amplifier mounted on the measuring rod, wherein a weight is received in the hollow guiding rod to connect to the measuring rod via a connector such that the measuring rod is able to maintain balance with respect to the guiding rod every time the measuring rod is moved;

a clamping device mounted under the fixing plate and including:

a brake disk securely connected to a bottom face of the fixing plate and having multiple first springs securely sandwiched between the brake disk and the fixing plate prior to engagement between the fixing plate and the brake plate and a bearing securely received in the brake disk;

a rotation disk having a centrally formed projection extending through the bearing of the brake disk and the fixing plate to connect to a securing ring such that the brake disk is sandwiched between the rotation disk and the fixing plate, the rotation disk further having bosses each formed on a peripheral edge of the rotation disk;

a driving disk defined with multiple first arcuate slots adjacent to a peripheral edge of the driving disk to correspond to the bosses of the rotation disk, multiple second arcuate slots each having a first end close to a center of the driving disk and a second end away from the center of the driving disk and multiple extensions formed under the driving disk and being close to the center of the driving disk; and clamping blocks each having a bar formed to correspond to one of the second arcuate slots of the driving disk and a through hole defined to correspond to one of the extensions of the driving disk such that each of the clamping blocks is able to selectively move from a first position to a second position and vice versa in the second arcuate slots for securing and releasing a workpiece; and a motor mounted on a side of the guiding rod to drive the driving disk to rotate via a belt; and a controlling device pivotal in relation to the fixing plate and operatably connected to the motor to activate the motor to rotate, the controlling device having a cutting blade securely mounted on the controlling device so that when the controlling device is pivoted toward the workpiece which is clamped by the clamping blocks, the cutting blade is able to cut the workpiece.

2. The assembly as claimed in claim 1, wherein the controlling device has a limiting plate securely connected to the fixing plate and defining therein a limiting slot, a tube pivotally connected to the fixing plate to receive therein a controlling handle which extends out of the limiting slot, whereby the pivotal movement of the tube drives the controlling handle to move in the limiting slot from a neutral position to a first location, a second location and a third location to respectively activate the motor to rotate, wherein when the controlling handle is moved from the neutral position to the first location, the clamping blocks are moved toward each other to clamp the workpiece, when the controlling handle is moved from the neutral position to the second location, the cutting blade is moved to cut the workpiece and when the controlling handle is moved from the neutral position to the third location, the motor is activated to allow the clamping blocks to move away from each other to release the workpiece.

3. The assembly as claimed in claim 1 further comprising a unidirectional device mounted on the fixing plate via a seat to allow the cutting blade to rotate for a small angle every time the cutting blade is driven by the controlling handle to cut the workpiece.

4. The assembly as claimed in claim 3, wherein the unidirectional device having a plug detachably received in a receiving hole in the seat, an abutting spring having a first end engaged with the plug, an abutting pin having a first end engaged with a second end of the abutting spring and a collar securely received in the receiving hole and having therein a path to allow a second end of the abutting pin to extend through the path to be connected to the cutting blade to force the cutting blade to rotate for a small angle.

5. The assembly as claimed in claim 2 further comprising a unidirectional device mounted on the fixing plate via a seat to allow the cutting blade to rotate for a small angle every time the cutting blade is driven by the controlling handle to cut the workpiece.

6. The assembly as claimed in claim 5, wherein the unidirectional device having a plug detachably received in a receiving hole in the seat, an abutting spring having a first end engaged with the plug, an abutting pin having a first end engaged with a second end of the abutting spring and a collar securely received in the receiving hole and having therein a path to allow a second end of the abutting pin to extend through the path to be connected to the cutting blade to force the cutting blade to rotate for a small angle.

7. The assembly as claimed in claim 6, wherein a second spring is provided on the seat to connect to the tube to provide a recovery force to the controlling handle.

8. The assembly as claimed in claim 7, wherein a block is formed on the tube and a stop is securely formed on the seat to selectively abut the block to limit the pivotal movement of the tube.

9. A window shade roller cutting assembly comprising:

a base adapted to be placed on a surface;

a hollow guiding rod perpendicularly mounted on top of the base and having a fixing plate securely mounted on a side of the guiding rod;

a measuring rod movable relative to the guiding rod and having equally spaced markings formed on the measuring rod and an amplifier mounted on the measuring rod, wherein a weight is received in the hollow guiding rod to connect to the measuring rod via a connector such that the measuring rod is able to maintain balance with respect to the guiding rod every time the measuring rod is moved;

a clamping device mounted under the fixing plate for clamping a window shade roller; and a controlling device pivotal in relation to the fixing plate and operatably connected to the clamping device, the controlling device having a cutting blade securely mounted on the controlling device so that when the controlling device is pivoted toward the window shade roller which is clamped by the clamping device, the cutting blade is able to cut the window shade roller.

10. The assembly as claimed in claim 9, wherein the controlling device has a limiting plate securely connected to the fixing plate and defining therein a limiting slot, a tube pivotally connected to the fixing plate to receive therein a controlling handle which extends out of the limiting slot, whereby the pivotal movement of the tube drives the controlling handle to move in the limiting slot from a neutral position to a first location, a second location and a third location to respectively activate the clamping device to rotate, wherein when the controlling handle is moved from the neutral position to the first location, the clamping device is able to clamp the window shade roller, when the controlling handle is moved from the neutral position to the second location, the cutting blade is moved to cut the window shade roller and when the controlling handle is moved from the neutral position to the third location, the clamping device is activated to release the window shade roller.

11. The assembly as claimed in claim 9 further comprising a unidirectional device mounted on the fixing plate via a seat to allow the cutting blade to rotate for a small angle every time the cutting blade is driven by the controlling handle to cut the workpiece.

12. The assembly as claimed in claim 11, wherein the unidirectional device having a plug detachably received in a receiving hole in the seat, an abutting spring having a first end engaged with the plug, an abutting pin having a first end engaged with a second end of the abutting spring and a collar securely received in the receiving hole and having therein a path to allow a second end of the abutting pin to extend through the path to be connected to the cutting blade to force the cutting blade to rotate for a small angle.

13. The assembly as claimed in claim 10 further comprising a unidirectional device mounted on the fixing plate via a seat to allow the cutting blade to rotate for a small angle every time the cutting blade is driven by the controlling handle to cut the workpiece.

14. The assembly as claimed in claim 13, wherein the unidirectional device having a plug detachably received in a receiving hole in the seat, an abutting spring having a first end engaged with the plug, an abutting pin having a first end engaged with a second end of the abutting spring and a collar securely received in the receiving hole and having therein a path to allow a second end of the abutting pin to extend through the path to be connected to the cutting blade to force the cutting blade to rotate for a small angle.

15. The assembly as claimed in claim 14, wherein a second spring is provided on the seat to connect to the tube to provide a recovery force to the controlling handle.

16. The assembly as claimed in claim 15, wherein a block is formed on the tube and a stop is securely formed on the seat to selectively abut the block to limit the pivotal movement of the tube.

17. The assembly as claimed in claim 9, wherein the clamping device includes:

a clamping device mounted under the fixing plate and including:

a brake disk securely connected to a bottom face of the fixing plate and having multiple first springs securely sandwiched between the brake disk and the fixing plate prior to engagement between the fixing plate and the brake plate and a bearing securely received in the brake disk;

a rotation disk having a centrally formed projection extending through the bearing of the brake disk and the fixing plate to connect to a securing ring such that the brake disk is sandwiched between the rotation disk and the fixing plate, the rotation disk further having bosses each formed on a peripheral edge of the rotation disk;

a driving disk defined with multiple first arcuate slots adjacent to a peripheral edge of the driving disk to correspond to the bosses of the rotation disk, multiple second arcuate slots each having a first end close to a center of the driving disk and a second end away from the center of the driving disk and multiple extensions formed under the driving disk and being close to the center of the driving disk;

clamping blocks each having a bar formed to correspond to one of the second arcuate slots of the driving disk and a through hole defined to correspond to one of the extensions of the driving disk such that each of the clamping blocks is able to selectively move from a first position to a second position and vice versa in the second arcuate slots for securing and releasing the window shade roller; and a motor mounted on a side of the guiding rod to drive the driving disk to rotate via a belt.

18. The assembly as claimed in claim 12, wherein the clamping device includes:

a clamping device mounted under the fixing plate and including:

a brake disk securely connected to a bottom face of the fixing plate and having multiple first springs securely sandwiched between the brake disk and the fixing plate prior to engagement between the fixing plate and the brake plate and a bearing securely received in the brake disk;

a rotation disk having a centrally formed projection extending through the bearing of the brake disk and the fixing plate to connect to a securing ring such that the brake disk is sandwiched between the rotation disk and the fixing plate, the rotation disk further having bosses each formed on a peripheral edge of the rotation disk;

a driving disk defined with multiple first arcuate slots adjacent to a peripheral edge of the driving disk to correspond to the bosses of the rotation disk, multiple second arcuate slots each having a first end close to a center of the driving disk and a second end away from the center of the driving disk and multiple extensions formed under the driving disk and being close to the center of the driving disk;

clamping blocks each having a bar formed to correspond to one of the second arcuate slots of the driving disk and a through hole defined to correspond to one of the extensions of the driving disk such that each of the clamping blocks is able to selectively move from a first position to a second position and vice versa in the second arcuate slots for securing and releasing the window shade roller; and a motor mounted on a side of the guiding rod to drive the driving disk to rotate via a belt.

19. The assembly as claimed in claim 13, wherein the clamping device includes:

a brake disk securely connected to a bottom face of the fixing plate and having multiple first springs securely sandwiched between the brake disk and the fixing plate prior to engagement between the fixing plate and the brake plate and a bearing securely received in the brake disk;

a rotation disk having a centrally formed projection extending through the bearing of the brake disk and the fixing plate to connect to a securing ring such that the brake disk is sandwiched between the rotation disk and the fixing plate, the rotation disk further having bosses each formed on a peripheral edge of the rotation disk;

a driving disk defined with multiple first arcuate slots adjacent to a peripheral edge of the driving disk to correspond to the bosses of the rotation disk, multiple second arcuate slots each having a first end close to a center of the driving disk and a second end away from the center of the driving disk and multiple extensions formed under the driving disk and being close to the center of the driving disk;

clamping blocks each having a bar formed to correspond to one of the second arcuate slots of the driving disk and a through hole defined to correspond to one of the extensions of the driving disk such that each of the clamping blocks is able to selectively move from a first position to a second position and vice versa in the second arcuate slots for securing and releasing the window shade roller; and a motor mounted on a side of the guiding rod to drive the driving disk to rotate via a belt.

20. The assembly as claimed in claim 16, wherein the clamping device includes:

a brake disk securely connected to a bottom face of the fixing plate and having multiple first springs securely sandwiched between the brake disk and the fixing plate prior to engagement between the fixing plate and the brake plate and a bearing securely received in the brake disk;

a rotation disk having a centrally formed projection extending through the bearing of the brake disk and the fixing plate to connect to a securing ring such that the brake disk is sandwiched between the rotation disk and the fixing plate, the rotation disk further having bosses each formed on a peripheral edge of the rotation disk;

a driving disk defined with multiple first arcuate slots adjacent to a peripheral edge of the driving disk to correspond to the bosses of the rotation disk, multiple second arcuate slots each having a first end close to a center of the driving disk and a second end away from the center of the driving disk and multiple extensions formed under the driving disk and being close to the center of the driving disk;

clamping blocks each having a bar formed to correspond to one of the second arcuate slots of the driving disk and a through hole defined to correspond to one of the extensions of the driving disk such that each of the clamping blocks is able to selectively move from a first position to a second position and vice versa in the second arcuate slots for securing and releasing the window shade roller; and a motor mounted on a side of the guiding rod to drive the driving disk to rotate via a belt.

* * * * *